United States Patent [19]

Olsen

[11] Patent Number: 5,254,878
[45] Date of Patent: Oct. 19, 1993

[54] VOLTAGE REGULATED POWER SUPPLY PROVIDING A CONSTANT OUTPUT VOLTAGE

[75] Inventor: Lawrence H. Olsen, Hudson, N.H.

[73] Assignee: Raytheon Company, Lexington, Mass.

[21] Appl. No.: 815,673

[22] Filed: Dec. 31, 1991

[51] Int. Cl.[5] .............................................. H02J 1/00
[52] U.S. Cl. ..................................... 307/75; 307/77; 323/266; 323/349
[58] Field of Search .......................... 307/4, 5, 75, 77; 323/266, 268, 349, 351; 363/43

[56] References Cited

U.S. PATENT DOCUMENTS 3,832,643  8/1974  Van Heyningen et al. ........... 363/43
4,628,438  12/1986  Montague ............................. 363/43

Primary Examiner—J. L. Sterrett
Attorney, Agent, or Firm—Donald F. Mofford; Richard M. Sharkansky

[57] ABSTRACT

A voltage regulator is provided for producing a predetermined output voltage level. The voltage regulator has a voltage source for providing a plurality of successively increasing voltage levels at a corresponding plurality of output terminals, or taps. A controller is provided for automatically selecting, in response to an electrical control signal, the one of the taps providing a voltage level above the predetermined output voltage level. In a preferred embodiment of the invention, the selected tap is the one of the plurality of taps producing a voltage level closest to, and greater than, the predetermined output voltage level. With such an arrangement, the electronic control signal allows a convenient way to select an output voltage level closest to, and greater in magnitude than, the predetermined voltage level, thereby improving the efficiency of the regulator.

8 Claims, 3 Drawing Sheets

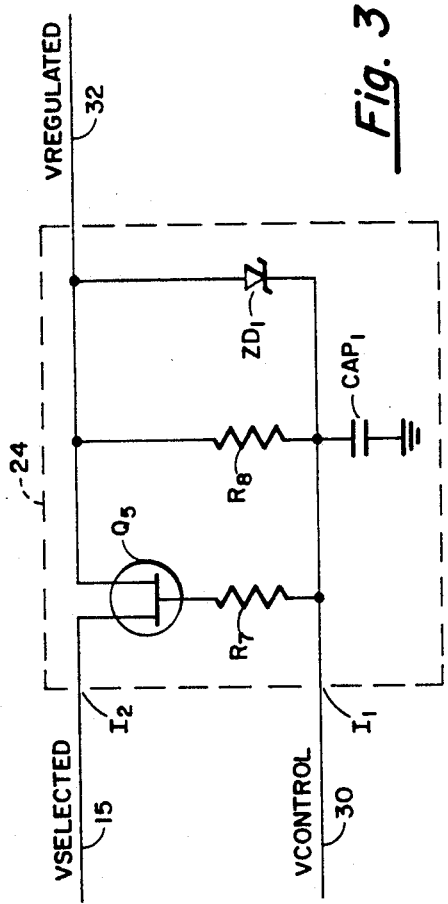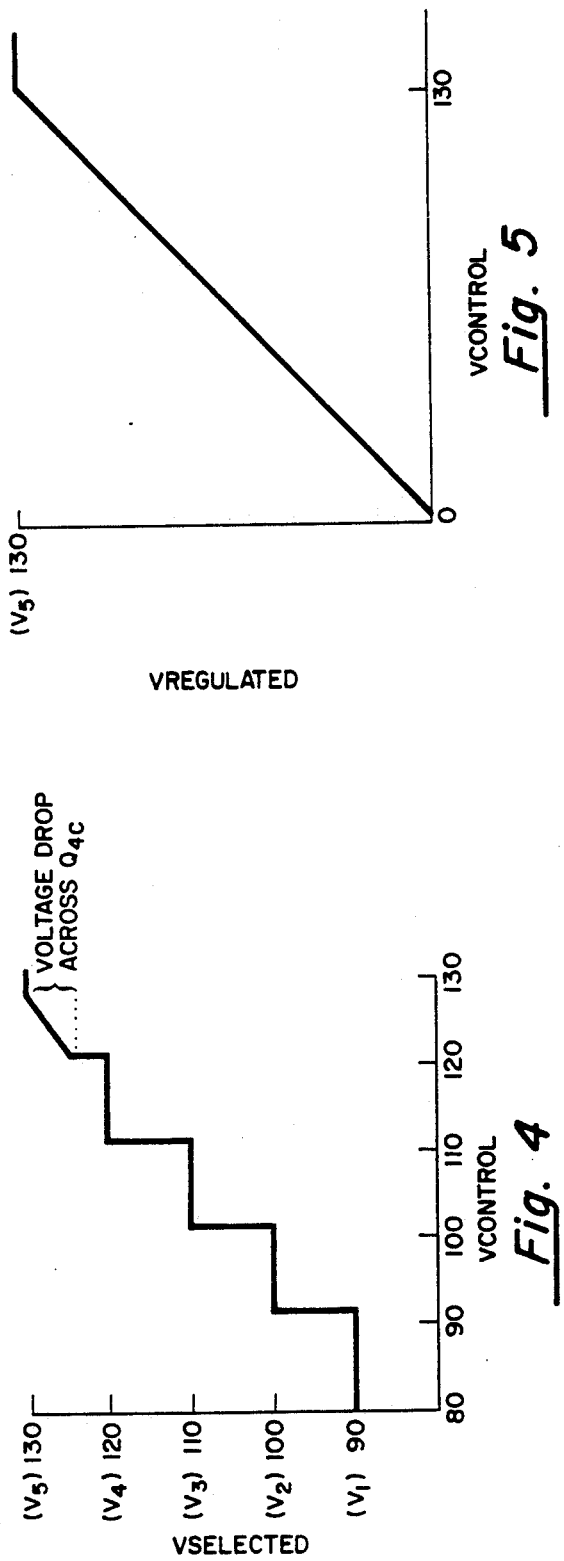

VOLTAGE REGULATED POWER SUPPLY PROVIDING A CONSTANT OUTPUT VOLTAGE

BACKGROUND OF THE INVENTION

The field of the invention generally relates to voltage regulators, and more particularly, relates to tapped voltage regulators.

As is well known, electronic voltage regulators are used to provide a accurate and steady desired DC output voltage level from a source of higher voltage level that may fluctuate in voltage level over time. Three common types of electronic voltage regulators are the series, shunt, and the switching regulators. In the series regulator a series "pass" element is connected in series with the voltage source. The series pass element is most commonly a transistor which acts as a variable resistance, a variable current source, or a variable voltage source. The output voltage of the series pass element is varied in accordance with a feedback signal. This feedback signal is derived from the desired output voltage, and acts in such a way as to vary the characteristics of the series pass element to keep the desired output voltage at a constant, desired level. With such an arrangement, the desired output voltage remains at a relatively constant level regardless of fluctuations of the source voltage level, or in the impedance of the load. One problem with the series electronic voltage regulator is that its efficiency is relatively low when there is a relatively large differential between the voltage level of the voltage source and the desired output voltage level. For example, if the source voltage level is supplied by a DC battery, the level of which may decrease over time, the initial source voltage level must be relatively high with respect to the desired output voltage level to assure continued proper operation after the source voltage has decreased. However, in the initial operating period, with the relatively high voltage level differential between the source voltage level and the desired output voltage level, power is dissipated in the series pass element at a relatively fast rate thereby reducing the efficiency of the regulator during the initial operating period. This dissipation of power at a relatively fast rate gives rise to the generation within the regulator of heat which must be dissipated.

In the shunt regulator, a shunt "pass" element is connected across, or in parallel with, the voltage source which has a finite output impedance. The shunt pass element is most commonly a Zener diode. The Zener diode acts as a variable resistance which is self-adjusting so as to keep the voltage level across the load equal to the Zener breakdown voltage level by forcing excess source voltage to be dropped across the voltage source output impedance. Therefore, a Zener diode should be chosen which has a Zener voltage equal to the desired output voltage level. Shunt electronic voltage regulators may also have relatively low efficiency during the initial operating period. For example, the efficiency of shunt regulators decreases as the current through the shunt "pass" element increases, as is the case during the initial operating period when the source voltage is substantially greater than the desired output voltage level.

A common switching electronic voltage regulator is a modification of the series electronic voltage regulator, such modification having additional energy storage elements. The difference is that in the switching electronic voltage regulator, the series switching "pass" element, or transistor, is switched between an "on" (low resistance) state, and an "off" (high resistance) state, instead of being set to a variable resistance or a variable current or voltage source somewhere between the aforementioned two extremes. During the "on" state, current flows through the series switching pass element, which has a very small resistance. Because the resistance of the series switching "pass" element is small, very little power is dissipated in the series switching "pass" element. During the "off" state, the resistance of the series switching "pass" element is very high, resulting in a negligible current flowing through the series switching "pass" element. As a result of only negligible current flowing through the series switching "pass" element, very little power is dissipated in it. The desired output voltage level is maintained by a feedback circuit which controls the duty cycle of the series switching "pass" element, or the amount of time the series switching "pass" element is in the "on" state compared to the amount of time it is in the "off" state. The duty cycle is inversely proportional to the difference between the source voltage level and the desired output voltage. That is, as the aforementioned difference increases, the duty cycle decreases; as the aforementioned difference decreases, the duty cycle increases. The pulsed voltage at the output of the series switching "pass element is then filtered to provide the desired output voltage. One problem with the switching voltage regulator is that the peak current through, and in some cases the peak voltage across, the series switching "pass" element is higher than the peak current through, and in some cases the peak voltage across, the series and shunt "pass" elements because the series switching "pass" element must provide the same amount of power in a shorter period of time, i.e., the time during which the series switching "pass" element is "on." Thus, a relatively large and expensive series switching "pass" element is generally required in switching regulators. Further, the corresponding pulses of current created by the switching action have fast rising and falling edges and therefore, high frequency components of current are generated. Such high frequency components may tend to cause high frequency energy to radiate from the switching regulator and cause interference in nearby circuitry.

Another well known method of voltage regulation is provided by a tapped voltage regulator. In such regulator, a plurality of successively increasing voltages is produced at a corresponding plurality of output taps. The desired output voltage is manually selected from one of the plurality of output taps. For example, a plurality of serially connected batteries may be used, each having one of the output taps. With such arrangement, a jumper may be used to physically connect the one of the taps which has a slightly greater voltage than the desired output voltage to the output terminal of the tapped regulator. As the voltage level at the selected tap decreases, the next higher voltage tap is manually connected by the use of the jumper. In this way, there is a small differential between the source voltage and the desired output voltage, as compared with a series voltage regulator, because the selected tap is only slightly higher in voltage than the desired output voltage. However, such arrangement makes a tapped regulator generally unsuitable for use where manual selection of the desired tap voltage is not feasible, such as in systems where the desired tap voltage must be selected more quickly and more accurately than can be done manually, where the cost makes manual selection impractical, or where the desired voltage must be a more exact value than which may be provided by any one of the plurality of taps.

SUMMARY OF THE INVENTION

With this background of the invention in mind, it is therefore an object of this invention to provide an improved voltage regulator.

It is another object of the invention to provide an improved voltage regulator having improved efficiency.

It is a further object of the invention to provide an improved voltage regulator of the type wherein the difference between the level of source voltage to the regulator and the level of the desired output voltage to be produced by the voltage regulator is automatically maintained at a minimum level.

It is still a further object of the invention to provide an improved voltage regulator of the type wherein the amount of generated high frequency energy is reduced.

These and other objects of the invention are attained generally by providing a voltage regulator for producing a predetermined output voltage level. The voltage regulator has a voltage source for providing a plurality of successively increasing voltage levels at a corresponding plurality of output terminals, or taps. A controller is provided for automatically selecting, in response to an electrical control signal, the one of the taps providing a voltage level above the predetermined output voltage level. In a preferred embodiment of the invention, the selected tap is the one of the plurality of taps producing a voltage level closest to, and greater than, the predetermined output voltage level. With such an arrangement, the electronic control signal allows a convenient way to select an output voltage level closest to, and greater in magnitude than, the predetermined voltage level thereby improving the efficiency of the regulator.

In accordance with an additional feature of the invention, a voltage regulator is provided for producing a predetermined output voltage level. The voltage regulator includes a voltage source for providing a plurality of successively increasing voltage levels at a corresponding plurality of output terminals, or taps. A voltage smoothing regulator is provided. The regulator includes a selector for coupling a selected one of the plurality of taps to the smoothing regulator. In a preferred embodiment, the one of the plurality of taps that is providing the voltage level closest to, and greater in magnitude than, a desired output voltage is selected and coupled to the smoothing regulator in response to a control signal. Such smoothing regulator produces, at an output thereof, the predetermined output voltage level in response to the control signal and the selected one of the plurality of voltage levels. With such an arrangement, the smoothing regulator, which may be of the series, shunt, or switching type is fed with a source of voltage having a minimum level to thereby reduce the power loss in any "pass" or power dissipative circuit element included in such smoothing regulator.

BRIEF DESCRIPTION OF THE DRAWINGS

The foregoing features of this invention, as well as the invention itself, may be more fully understood from the following detailed description of the drawings, in which:

FIG. 3 is a schematic diagram of a smoothing regulator used in the voltage regulator of FIG. 1;

FIG. 4 is a graph showing a signal VSELECTED produced by the controller of FIG. 2 plotted against a signal VCONTROL used by the regulator of FIG. 1; and FIG. 5 is a graph showing a signal VREGULATED produced by the smoothing regulator of FIG. 3 plotted against the signal VCONTROL used by the regulator of FIG. 1.

DESCRIPTION OF THE PREFERRED EMBODIMENTS

Figure 1:
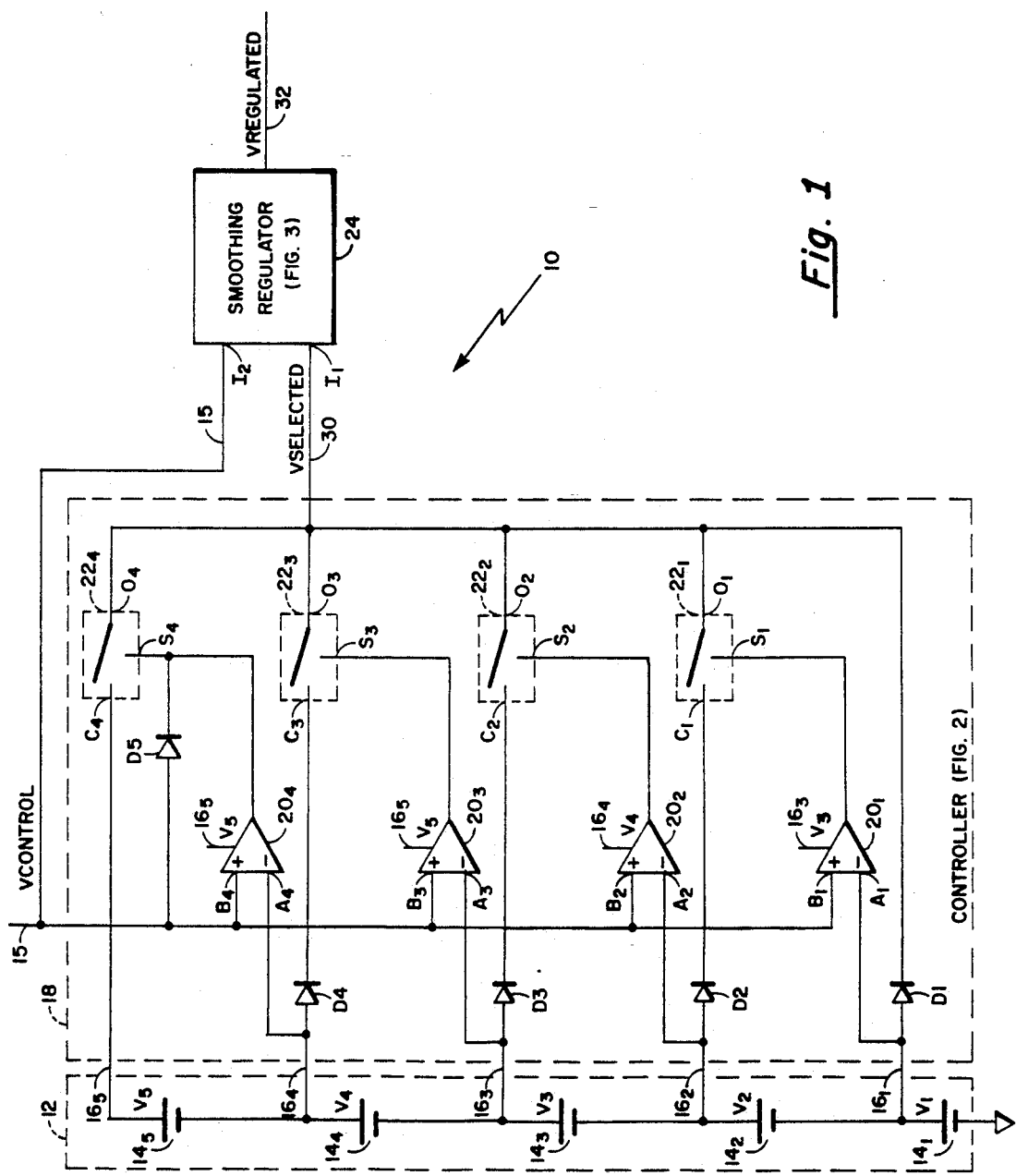
FIG. 1 is a block diagram of a voltage regulator in accordance with the invention.
Figure 2:
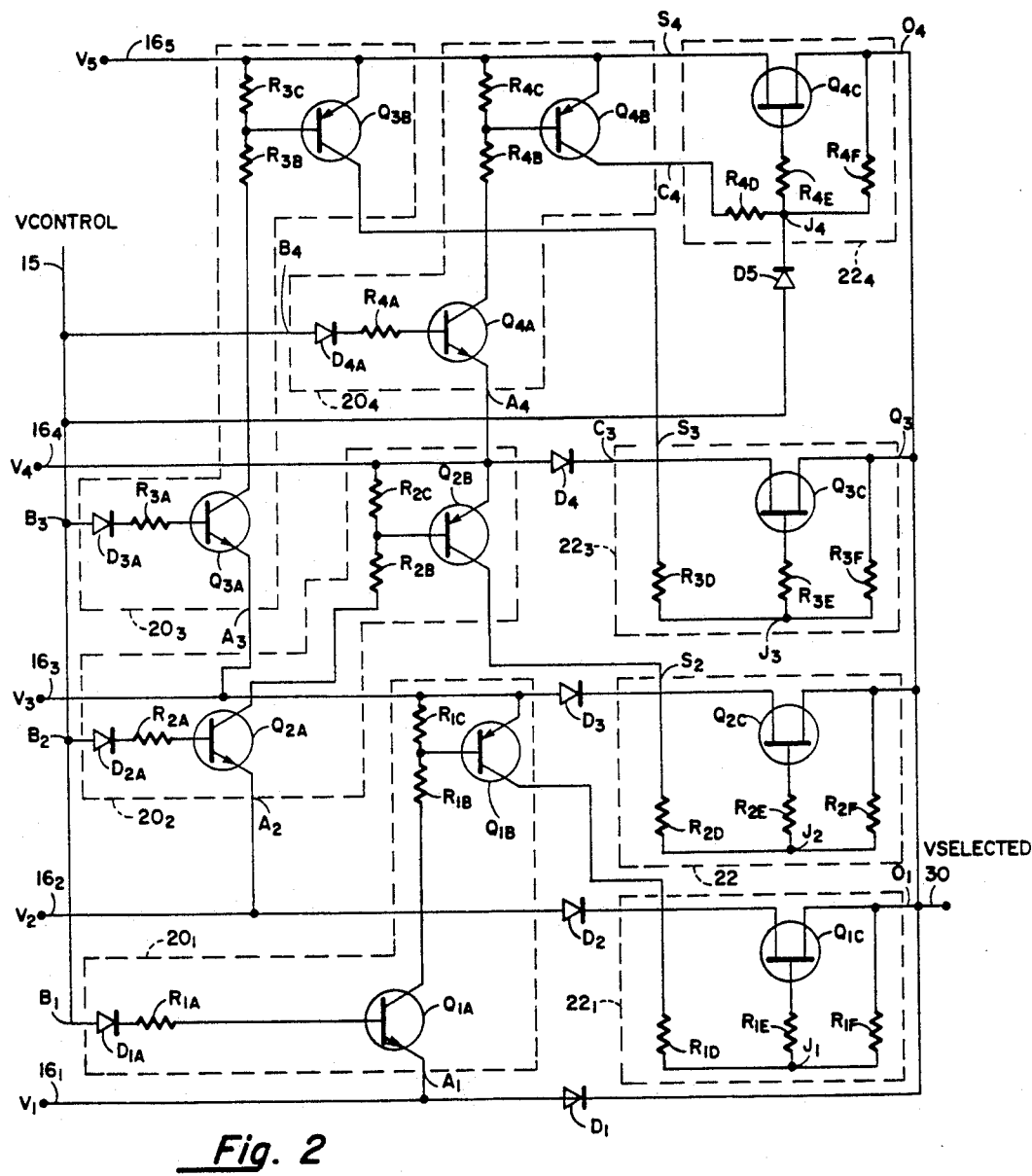
FIG. 2 is a schematic diagram of a controller used in the regulator of FIG. 1.

Referring now to FIG. 1, a voltage regulator 10 is shown to produce a regulated output voltage, VREGULATED, having a predetermined output voltage level. More specifically, voltage regulator 10 includes a voltage source 12, having a plurality of, here 5, batteries $14_1$-$14_5$ serially connected to produce a plurality of successively increasing voltage levels $V_1$-$V_5$, at a corresponding plurality of output taps $16_1$-$16_5$. A controller 18, the details of which will be described in detail in connection with FIG. 2, is provided. Suffice it to say here, however, that controller 18 includes: a plurality of, here 4, comparators $20_1$-$20_4$; a plurality of, here 4, diodes $D_1$-$D_4$; and a plurality of, here 4, switches $22_1$-$22_4$ arranged, as shown, to automatically couple, in response to control voltage VCONTROL, a selected one of the taps $16_1$-$16_5$ (and hence a selected one of the voltage levels $V_1$-$V_5$) to the input of smoothing regulator 24. More particularly, the one of the taps $16_1$-$16_5$ selected produces a voltage level closest to, and greater than the predetermined output voltage level to be produced by the voltage regulator 10. In this way the efficiency of a smoothing regulator 24, included in the voltage regulator 10, is maximized. As will be described in detail in connection with FIG. 3, smoothing regulator 24, in response to VCONTROL, generates the desired output voltage VREGULATED.

Voltage source 12 includes DC batteries $14_1$-$14_5$ connected in series (with the negative potential of battery $14_1$ connected to ground potential) to generate voltages $V_1$-$V_5$, with $V_1$ being of the lowest voltage potential and $V_5$ being of the highest voltage potential. The voltage potentials of $V_1$-$V_5$ here range from 90 to 130 volts in 10 volt increments, although one skilled in the art will see the range, increment values and number of voltages can be changed while keeping within the scope of the invention. Voltage $V_1$-$V_4$ are coupled to negative (−) input terminals $A_1$-$A_4$, respectively, of a corresponding one of the comparators $20_1$-$20_4$, respectively, as shown. Coupled to positive (+) input terminals $B_1$-$B_4$, of the comparators $20_1$-$20_4$ is a signal, VCONTROL, on line 15. Comparators $20_1$-$20_4$ compare the voltage level of signal VCONTROL with the voltage levels $V_1$-$V_4$. The outputs of comparators $20_1$-$20_4$ are coupled to terminals $S_1$-$S_4$, respectively, of the switches $22_1$-$22_4$, respectively, as shown. When the voltage level of VCONTROL is greater than a number of the voltages $V_1$-$V_4$, a corresponding number of respective switches $22_1$-$22_4$ are closed. For example, if the level of VCONTROL is greater than $V_1$, $V_2$ and $V_3$, then switches $22_1$-$22_3$ are closed. The inputs $C_1$-$C_4$ of switches $22_1$-$22_4$, respectively, are coupled to voltages $V_2$-$V_5$, respectively, as shown. The outputs $O_1$-$O_4$ of switches $22_1$-$22_4$ are all coupled to the input $I_1$ of smoothing regulator 24, via line 30, as shown. Diodes $D_1$-$D_4$ act to prevent a short circuit from occurring between any combination of two or more voltages potentials $V_1$-$V_5$. For example, if the level of signal VCONTROL is greater than $V_2$, then switches $22_1$-$22_2$ are closed. If diodes $D_1$-$D_2$ were not in place, voltage $V_3$ would be short circuited to $V_1$ and $V_2$. With diodes $D_1$-$D_2$ in place, when switches $22_1$-$22_2$ are closed, diodes $D_1$-$D_2$ become reversed biased, thereby preventing a short circuit between $V_3$, $V_2$ and $V_1$.

Smoothing regulator 24 will be described in detail in connection with FIG. 3. Suffice it to say here, however, that it is responsive to the signal VCONTROL in such a way that its output voltage, VREGULATED, on line 32 is always a nominal voltage, here two volts, below the level of the voltage of signal, VCONTROL. That is, the output voltage VREGULATED from smoothing regulator 24 follows changes in VCONTROL, but is offset from VCONTROL by two volts. Smoothing regulator 24 requires that its input voltage (i.e. VSELECTED on line 30) be equal to, or greater than, its output voltage (VREGULATED on line 32). The above-described operation of comparators $20_1$-$20_4$ and switches $22_1$-$22_4$ insure that the input voltage VSELECTED on line 30 to the smoothing regulator 24 (i.e. the voltage at terminal $I_1$) is always at least slightly greater than the output voltage level VREGULATED of the smoothing regulator 24.

Referring now to FIG. 2, controller 18, and more particularly, comparators $20_1$-$20_4$ and switches $22_1$-$22_4$, thereof, is shown in more detail. It is first noted that each one of the comparators $20_1$-$20_4$ is identical in construction and include: NPN transistors $Q_{1A}$-$Q_{4A}$, respectively; PNP transistors $Q_{1B}$-$Q_{4B}$, respectively; resistors $R_{1A}$-$R_{4A}$, respectively; resistors $R_{1B}$-$R_{4B}$, respectively; resistors $R_{1C}$-$R_{4C}$, respectively; and diodes $D_{1A}$-$D_{4A}$, respectively, as shown. It is next noted that each one of the switches $22_1$-$22_4$ is identical in construction and include: resistors $R_{1D}$-$R_{4D}$, respectively; resistors $R_{1E}$-$R_{4E}$, respectively; resistors $R_{1F}$-$R_{4F}$, respectively; and FETs $Q_{1C}$-$Q_{4C}$, respectively, as shown. The operation of comparator $20_1$ will be described, it being understood that the operation of comparators $20_2$-$20_4$ is identical to that of $20_1$. As shown, the signal VCONTROL is coupled via line 15, to positive input $B_1$ of comparator $20_1$, more particularly to the anode of diode $D_{1A}$. The cathode of $D_{1A}$ is coupled to the base of transistor $Q_{1A}$ through resistor $R_{1A}$. The emitter of transistor $Q_{1A}$, which is the negative input $A_1$ of comparator $20_1$, is coupled to the voltage tap $16_1$ providing voltage potential $V_1$, while the collector of $Q_{1A}$ is coupled to the base of transistor $Q_{1B}$ through resistor $R_{1B}$. The base of transistor $Q_{1B}$ is coupled to voltage $V_3$ (via tap $16_3$) through resistor $R_{1C}$. The collector of transistor $Q_{1B}$ acts as the output of comparator $20_1$ and is coupled to terminal $S_1$ of switch $22_1$, as shown.

In operation, when the voltage of signal VCONTROL is lower than $V_1$, transistor $Q_{1B}$ is in the "off" state. That is, no current flows from the emitter of $Q_{1B}$ through to the collector of $Q_{1B}$. As the voltage of signal VCONTROL increases beyond the voltage $V_1$, the voltage of signal VCONTROL reaches a point at which it is large enough to induce a current through diode $D_{1A}$ and resistor $R_{1A}$ which turns "on" transistor $Q_{1A}$. Transistor $Q_{1A}$ then draws a current from voltage potential $V_3$ through resistors $R_{1A}$ and $R_{1C}$. As the voltage across resistor $R_{1C}$ increases, transistor $Q_{1B}$ is turned "on" and provides a current flowing out from the collector of transistor $Q_{1B}$ to input $S_1$ of switch $22_1$. Thus, a signal is output from comparator $20_1$ indicating to switch $22_1$ that VCONTROL is greater than $V_1$.

The structure and operation of switch $22_1$ will now be described, with the understanding that, as noted above, switches $22_2$-$22_4$ have identical operation and structure as switch $22_1$. Thus one end of resistor $R_{1D}$ acts as the switching control input of switch $22_1$. The opposite end of resistor $R_{1D}$ is coupled to resistors $R_{1E}$ and $R_{1F}$. The opposite end of resistor $R_{1E}$ is coupled to the gate of transistor $Q_{1C}$, while the opposite end of resistor $R_{1E}$ is coupled to the source of transistor $Q_{1C}$. The drain of transistor $Q_{1C}$, which is the input $C_1$ of switch $22_1$, is coupled to the cathode of diode $D_2$, whose function was described above. The anode of diode $D_2$ is coupled to tap $16_2$ providing the voltage potential $V_2$. The source of $Q_{1C}$ is the output $O_1$ of switch $22_1$.

When a current flows into the input $C_1$ of switch $22_1$, as a result of transistor $Q_{1b}$ of comparator $16_1$ being turned on and having its output current limited by resistors $R_{1D}$ and $R_{1F}$, the current flows through resistor $R_{1D}$ and $R_{1F}$, creating a voltage at their junction, $J_1$, which is always greater than the voltage at the output $O_1$ of switch $22_1$. The large resistance of the gate of transistor $Q_{1C}$ permits only a negligible amount of current to flow through resistor $R_{1E}$, whose main function is to dampen or prevent any oscillations caused by the gate capacitance of transistor $Q_{1C}$ and any inductance inherent in the connection between $R_{1E}$ and the gate of transistor $Q_{1C}$, or any other instability inherent in transistor $Q_{1C}$ at its gate terminal. The voltage at the junction, $J_1$, is at virtually the same voltage potential as the voltage potential at the gate of transistor $Q_{1C}$. This voltage at the gate of transistor $Q_{1C}$ not only turns "on" transistor $Q_{1C}$, but forces transistor $Q_{1C}$ to operate in its saturation, or low internal resistance, region as well. As a result, if the very small voltage drop across the drain to source junction of $Q_{1C}$ due to its low internal resistance is ignored, the voltage at the source of $Q_{1C}$, the output $O_1$ of switch $22_1$, will virtually be the same as the voltage at the drain of $Q_{1C}$, the input $C_1$ of switch $22_1$. As a result, very little power will be dissipated in transistor $Q_{1C}$. The voltage potential provided at the output $O_1$ of switch $22_1$ will then be voltage potential $V_2$, minus any forward bias voltage drop across diode $D_2$.

The combination of comparator $20_1$ and switch $22_1$ works as follows: As VCONTROL increases to a point beyond voltage potential $V_1$, comparator $20_1$ turns "on" and comparator $20_1$ then supplies a current to the input $S_1$ of switch $22_1$, this current being sufficient to close switch $22_1$. Thus, voltage potential $V_2$, minus the voltage drop across diode $D_2$, is coupled to the input $I_1$ (FIG. 1) of smoothing regulator 24 via line 30. That is, the voltage level of the signal VSELECTED on line 30 equals $V_2$ minus the voltage drop across diode $D_2$. The only difference between comparator $20_1$ and comparator $20_4$ is that the emitter of $Q_{4B}$ is coupled to voltage level $V_5$, which is the same voltage as that which switch $20_4$, when closed, couples to the input of smoothing regulator 24. Each emitter of transistors $Q_{1B}$-$Q_{3B}$ of comparators $20_1$-$20_3$ respectively, is coupled to the next higher voltage potential than the voltage potential its corresponding switch $22_1$-$22_3$, when closed, couples to smoothing regulator 24. Each emitter of transistors $Q_{1B}$-$Q_{3B}$ is coupled to the next higher voltage potential to insure sufficient voltages at the gates of transistors $Q_{1C}$-$Q_{3C}$ so that these transistors $Q_{1C}$-$Q_{3C}$ operate in their saturation, or low internal resistance, mode. (Thus, referring to FIG. 1, the emitters of transistors $Q_{1B}$–$Q_{3B}$ of comparators $20_1$–$20_3$ respectively, are coupled to voltages $V_3$–$V_5$). For example, the emitter of transistor $Q_{1B}$ of comparator $20_1$ is coupled to $V_3$, which is the next higher voltage potential from $V_2$, which is coupled to smoothing regulator 24 by corresponding switch $22_1$. The result is that the highest voltage potential attainable at the output of comparator $20_4$, is $V_5$. This results in the voltage potential at the gate of transistor $Q_{4C}$ of switch $22_4$ being smaller than $V_5$; therefore, transistor $Q_{4C}$ will not, absent the configuration used and described hereinafter, be forced into saturation. Thus, if transistor $Q_{4C}$ were not to go into saturation there will be a voltage drop across transistor $Q_{4C}$ from its drain to its source and the largest attainable voltage potential at the output of switch $22_4$ would be substantially less than $V_5$.

In order to overcome the above problem and make the saturation of transistor $Q_{4C}$ possible, another input has been added to switch $22_4$, and this additional input is the only difference between switches $22_4$ and $22_1$. This additional input and its function will now be described. Referring also to FIG. 1, it is noted that a diode $D_5$ has its anode coupled to the signal VCONTROL, via line 15, and its cathode coupled to the junction, $J_4$, between resistors $R_{4D}$ and $R_{4F}$ of switch $22_4$. When the voltage level of the signal VCONTROL is less than the voltage at the junction $J_4$, diode $D_5$ is reversed biased, and prevents a short circuit between VCONTROL and the aforementioned junction, $J_4$. As VCONTROL increases above the voltage level at the junction $J_4$ and diode $D_5$ turns "on", the voltage level of the signal VCONTROL, reduced by the voltage drop across diode $D_5$, is applied to the junction, $J_4$. As described above, a negligible amount of current flows through resistor $R_{4E}$ due to the high impedance of the gate of transistor $Q_{4C}$. As a result, the voltage potential at the junction, $J_4$ is virtually equal to the voltage potential at the gate of transistor $Q_{4C}$. As the voltage level of the signal VCONTROL increases still further beyond the voltage level of $V_5$, $Q_{4C}$ will now be forced into saturation, and the voltage potential $V_5$ will be coupled to the input of smoothing regulator 24 via line 30. With this arrangement, the maximum voltage level available from the voltage source 12 is coupled to the input of smoothing regulator 24.

Referring now to FIG. 3, smoothing regulator 24 is here the series voltage regulator type. The input $I_2$ of smoothing regulator 24 is the drain of transistor $Q_5$, which, referring briefly to FIG. 2 is coupled to the collective outputs of switches $22_1$–$22_4$ via line 30, as well as to voltage level $V_1$ through diode $D_1$. The source of transistor $Q_5$ provides the output signal VREGULATED on line 32. Resistor $R_7$ is coupled between input $I_1$ (signal VCONTROL) and the gate of transistor $Q_5$. Capacitor $CAP_1$ is coupled between input $I_1$ and ground, as shown. Resistor $R_8$ is coupled between input $I_1$ and the source of transistor $Q_5$, as shown. A Zener diode $ZD_1$ is included, having its anode coupled to the source of $Q_5$ and its cathode coupled to input $I_1$, as shown.

Transistor $Q_5$ is configured as a source follower. That is, an increase in the voltage potential at the gate of transistor $Q_5$ will result in a corresponding increase in voltage potential at the source of transistor $Q_5$. Likewise, a decrease in voltage potential at the gate of transistor $Q_5$ will result in corresponding decrease in voltage potential at the source of transistor $Q_5$. The gate of transistor $Q_5$ has a relatively high impedance, so the amount of current flowing through $R_7$ into the gate of transistor $Q_5$ is negligible. As a result, the signal VCONTROL provides the voltage potential at the gate of transistor $Q_5$. An increase or decrease in the voltage level of the signal VCONTROL will induce a corresponding, respective increase or decrease in the level of the output voltage on line 32 (i.e. in the voltage of the signal VREGULATED from smoothing regulator 24). There will, however, always be a relatively fixed difference of approximately two volts between the smoothing regulator 24 output voltage VREGULATED and the level of the voltage of signal VCONTROL. That is, the voltage of signal VREGULATED will always be smaller than the voltage of the signal VCONTROL by approximately two volts. This two volt difference is the "turn-on" voltage required between the gate and source of transistor $Q_5$ in order to enable transistor $Q_5$ to conduct current from its drain to its source. Zener diode $ZD_1$ protects the gate to source junction of transistor $Q_5$ from voltage levels which might damage transistor $Q_5$. For example, such voltage levels as might occur without the presence ZD if the source of $Q_5$, which is the output of smoothing regulator 24, became short circuited to ground. Resistor $R_7$ acts to dampen or prevent any oscillations due to the combination of the gate capacitance of transistor $Q_5$ and the stray inductance in the connection between $R_7$ and the gate of $Q_5$, and to otherwise stabilize $Q_5$. Resistor $R_8$ and capacitor $CAP_1$ serve to provide proper impedance termination to any transmission line which would couple smoothing regulator 24 output voltage on line 30 (i.e. VREGULATED) to another circuit where power is needed.

Referring now to FIG. 4, a graph is shown of a plot of the voltage of the signal VSELECTED on the vertical axis versus the voltage of the signal VCONTROL on the horizontal axis. As noted, the voltage of the signal VSELECTED is switched to the next highest tap voltage potential $V_2$–$V_5$ when the voltage of the signal VCONTROL becomes two diode drops, or about 1.4 volts, greater than the voltage at the tap voltage $V_1$–$V_4$ presently providing VSELECTED. For example, when the voltage of the signal VCONTROL equals 98 volts, the voltage of signal VSELECTED equals voltage $V_2$, which is 100 volts. When the voltage of signal VCONTROL increases to equal approximately 101.4 volts, the voltage of signal VSELECTED is switched from the potential $V_2$, which is 100 volts to potential $V_3$, which is 110 volts.

When the voltage of signal VCONTROL equals 121.4 volts, the voltage of signal VSELECTED is switched to approximately 127 volts because $Q_{4C}$ is not saturated, as explained previously. As the voltage of signal VCONTROL increases, it is coupled to the gate of $Q_{4C}$ through the previously described second input of switch $22_4$ (i.e. through diode $D_5$). Thus, when the voltage of signal VCONTROL equals approximately 132 volts, $Q_{4C}$ begins to saturate, and the voltage of signal VSELECT becomes equal to $V_5$, which is 130 volts. The 2 volt difference is the turn on voltage required for transistor $Q_{4C}$.

Referring now to FIG. 5, a graph is shown of the voltage of the signal VREGULATED along the vertical axis plotted against the voltage of the signal VCONTROL on the horizontal axis. The voltage of the signal VREGULATED is always approximately 2 volts less than the voltage of the signal VCONTROL. For example, when the voltage of the signal VCONTROL is 92 volts, the voltage of the signal VREGULATED is approximately 90 volts. This is due to the turn on voltage required by transistor $Q_5$.

In this example, the maximum voltage of the signal VREGULATED is the voltage potential $V_5$, which is 130 volts. That is, once the voltage of the signal VCONTROL reaches approximately 132 volts, the voltage of the signal VREGULATED will remain at approximately 130 volts, even as the voltage of the signal VCONTROL increases further.

This concludes the Description of the Preferred Embodiments. A reading of those skilled in the art will bring to mind many modifications and alternatives without departing from the spirit and scope of the invention. For example, an AC voltage source may be used to generate the plurality of successively increasing voltage levels at a corresponding plurality of output taps. Accordingly, it is intended that the invention only be limited by the following claims.

What is claimed is:

1. A regulated power supply comprising:
   a) a voltage source having a plurality of outputs, each output having a successive increasing voltage level;
   b) means, responsive to a control voltage signal, for selecting one of the plurality of outputs of the voltage source, the selecting means comprising:
      (i) a plurality of switches, each switch coupled to a corresponding one of the outputs of the voltage source; and
      (ii) comparator means, responsive to the control voltage signal and each one of the outputs of the voltage source, for selecting one of the outputs of the voltage source, the selected one of the outputs of the voltage source having a voltage level greater than the control voltage signal, the comparator means comprising:
         a first and a second transistor, each transistor having a base, an emitter and a collector, the emitter of the first transistor connected to a first one of the outputs of the voltage source, the emitter of the second transistor connected to the second successive output from the first one of the outputs of the voltage source;
         a first resistor disposed between the base of the second transistor and the second successive voltage source output and a second resistor disposed between the base of the second transistor and the collector of the first transistor;
         a third resistor having a first terminal and a second terminal, the first terminal connected to the base of the first transistor; and
         a diode disposed between the second terminal of the third resistor and the control voltage signal; and
   c) smoothing regulator means, responsive to the control voltage signal and the selected one of the outputs of the voltage source, for providing a predetermined voltage level signal.

2. The regulated power supply as recited in claim 1 wherein each switch comprises:
   (a) a transistor having a gate, a source and a drain, the drain connected to a corresponding one of the outputs of the voltage source;
   (b) a first resistor having a first terminal and a second terminal, the first terminal connected to the gate of the transistor, a second resistor connected between the source of the transistor and the second terminal of the first resistor and a third resistor connected between the second terminal of the first resistor and the comparator means.

3. The regulated power supply as recited in claim 1 wherein the smoothing regulating means comprises:
   (a) a transistor having a gate, a source and a drain, the drain connected to the selected one of the outputs of the voltage source and the source providing the predetermined voltage signal;
   (b) a first resistor connected between the gate of the transistor and the control voltage signal and a second resistor connected between the control voltage signal and the source;
   (c) a zener diode connected between the control voltage signal and the source; and
   (d) a capacitor connected between the control voltage signal and a ground potential.

4. A power supply comprising:
   means, in response to a control signal, for coupling a selected one of a plurality of successively increasing voltage level sources to an output, such coupling means comprising:
      a) a plurality of comparators, each comparator having a pair of inputs and an output, a first one of the pair of inputs coupled to the control signal, a second one of the pair inputs coupled to a corresponding, different one of the plurality of successively increasing voltage level sources, each comparator comprising:
         (i) a first and a second transistor, each transistor having a base, an emitter and a collector, the emitter of the first transistor connected to a first one of the successively increasing voltage level sources, the emitter of the second transistor connected to a second successive one of the successively increasing voltage level sources from the first one of the successively increasing voltage level sources of the voltage source;
         (ii) a first resistor disposed between the base of the second transistor and the second successive one of the successively increasing voltage level sources and a second resistor disposed between the base of the second transistor and the collector of the first transistor;
         (iii) a third resistor having a first terminal and a second terminal, the first terminal connected to the base of the first transistor; and
         (iv) a diode disposed between the second terminal of the third resistor and the control voltage signal;
      b) a plurality of switches, each switch having an input, an output and a control port, the input coupled to that next successive one of the plurality of successively increasing voltage level sources having a voltage level less than a voltage level of the second one of the inputs of the one of the plurality of comparators corresponding thereto, the control port coupled to the output of a corresponding comparator, each one of the plurality of switches selectively coupling, or decoupling, the input thereof to the output thereof in accordance with the output of the corresponding one of the plurality of comparators; and
   smoothing regulator means, responsive to the control signal and the selected one of the plurality of successively increasing voltage level sources, for providing a predetermined voltage level signal.

5. The power supply as recited in claim 4 wherein each one of the plurality of switches comprises:
   (a) a transistor having a gate, a source and a drain, the drain connected to a corresponding one of the successively increasing voltage level sources;
   (b) a first resistor having a first terminal and a second terminal, the first terminal connected to the gate of the transistor, a second resistor connected between the source of the transistor and the second terminal of the first resistor and a third resistor connected between the second terminal of the first resistor and the output of the corresponding one of the plurality of comparators.

6. The power supply as recited in claim 4 wherein the smoothing regulator means comprises:
   (a) a transistor having a gate, a source and a drain, the drain connected to the selected one of the plurality of successively increasing voltage level sources and the source providing the predetermined voltage signal;
   (b) a first resistor connected between the gate of the transistor and the control signal and a second resistor connected between the control signal and the source;
   (c) a zener diode connected between the control signal and the source; and
   (d) a capacitor connected between the control signal and a ground potential.

7. A power supply comprising:
   a) a voltage source having a plurality of different voltage level outputs;
   b) a plurality of switches, each switch having an input, an output and a control port, the input of each switch coupled to a corresponding one of the different voltage level outputs of the voltage source;
   c) a plurality of comparators, each comparator having a first and second input and an output, the first input coupled to a control voltage signal, the second input coupled to a corresponding one of the different voltage level outputs of the voltage source and the output of each comparator coupled to the control port of a corresponding switch, each comparator comprising:
      (i) a first and a second transistor, each transistor having a base, an emitter and a collector, the emitter of the first transistor connected to a first one of the different voltage level outputs of the voltage source, the emitter of the second transistor connected to a second successive one of the different voltage level outputs from the first one of the different voltage level outputs of the voltage source;
      (ii) a first resistor disposed between the base of the second transistor and the second successive one of the different voltage level outputs and a second resistor disposed between the base of the second transistor and the collector of the first transistor;
      (iii) a third resistor having a first terminal and a second terminal, the first terminal connected to the base of the first transistor; and
      (iv) a diode disposed between the second terminal of the third resistor and the control voltage signal; and
   d) a smoothing regulator having an input, an output and a control port, the input coupled to the outputs of the switches and the control port coupled to the control voltage signal.

8. The power supply as recited in claim 7 wherein the smoothing regulator comprises:
   (a) a transistor having a gate, a source and a drain, the drain connected to the selected one of the different voltage level outputs of the voltage source and the source providing a predetermined voltage signal;
   (b) a first resistor connected between the gate of the transistor and the control voltage signal and a second resistor connected between the control voltage signal and the source;
   (c) a zener diode connected between the control voltage signal and the source; and
   (d) a capacitor connected between the control voltage signal and a ground potential.

* * * * *